United States Patent [19]
Anders et al.

[11] 4,098,489
[45] Jul. 4, 1978

[54] SEGMENTED HUB FOR RETAINING THE SPACER RING OF A TWO PIECE GATE VALVE

[75] Inventors: Ronald James Anders, Raleigh, N.C.; Ramesh Mohan, Warrensville Heights, Ohio

[73] Assignee: Rockwell International Corporation, Pittsburgh, Pa.

[21] Appl. No.: 715,086

[22] Filed: Aug. 17, 1976

[51] Int. Cl.² .............................................. F16K 3/12
[52] U.S. Cl. .................................................. 251/327
[58] Field of Search ........................................ 251/327

[56] References Cited
U.S. PATENT DOCUMENTS
786,043  3/1905  Luckett ............................ 251/327 X
FOREIGN PATENT DOCUMENTS
282,318  12/1927  United Kingdom ................. 251/327

Primary Examiner—Arnold Rosenthal

[57] ABSTRACT

A two piece gate valve of the type having the gate discs operatively spaced by an annular spacer ring of predetermined width includes intermeshing lug on the juxtaposed surfaces of the discs forming a segmented circular hub interiorly bounding the spacer ring and expandable to accommodate spacer rings of varying predetermined widths.

9 Claims, 13 Drawing Figures

4,098,489

SEGMENTED HUB FOR RETAINING THE SPACER RING OF A TWO PIECE GATE VALVE

BACKGROUND OF THE INVENTION

This invention relates to two-piece gate valves and, in particular, a two-piece gate valve having the gate pieces operatively spaced by a spacer ring.

Double disc gates have been proposed for gate valves because of certain inherent functional and manufacturing advantages. Such constructions, in view of the larger freedom of movement of the independent discs, can conform to larger manufacturing variations in the discs and the valve seats while, at the same time, provide complete sealing despite distortion of the seats due to differential heating and cooling rates and system stresses.

SUMMARY OF THE INVENTION

In the copending application by one of the co-inventors herein, Ronald J. Anders, Ser. No. 605,277, filed on Aug. 18, 1976, now abandoned entitled "Double Disc Gate Valve and Replaceable Spacer Ring" and assigned to the assignee of the present invention, a valve was provided incorporating two juxtaposed identically formed discs. In assembly, the discs were interfitted together by an interlocking segmented hub, made in accordance with the present invention. The discs were spaced a predetermined distance apart by an annular spacer ring captured by the hub. The spacer ring is of a predetermined width to establish a desired overall operative width of the gate. In this manner, the spacer ring can be appropriately independently sized and selected to accommodate various tolerances in the individual disc while still providing a predetermined overall width necessary to ensure sealing mating of the seating surfaces in the valve closed position. Additionally, when the valve seats and seating surfaces become scored or otherwise damaged such that regrinding is necessary, the amount of removed material can be compensated for by increasing the width of the spacer ring to once again re-establish the desired relationship between the seating surfaces in the fully closed position. The spacer ring has a substantially smaller diameter than the seating surfaces to increas the disc deflection capability.

The segmented hub of the present invention is in the torm of interfitting lugs identically formed on each gate disc with formed circular segmented outer wall which is engageable with the inner surface of the spacer ring to capture the ring in operative position. The interfitting of the lugs permits the spacing of the gates to increase to accommodate spacer rings of varying predetermined width while each lug retains an operative capturing relationship with the ring. Also the interfitting permits greater spacing accommodations than with abutting lugs. In one form of the invention, the lugs are interfitting semi-circular projections. In another form the lugs are a plurality of circumferentially spaced interfitting circular sectors. Also disclosed herein is a method for forming such segmented hubs.

The above and other features of the present invention will be apparent to those skilled in the art upon reading the following detailed description, reference being made to the drawings in which.

DESCRIPTION OF THE PREFERRED EMBODIMENTS

Figure 1:
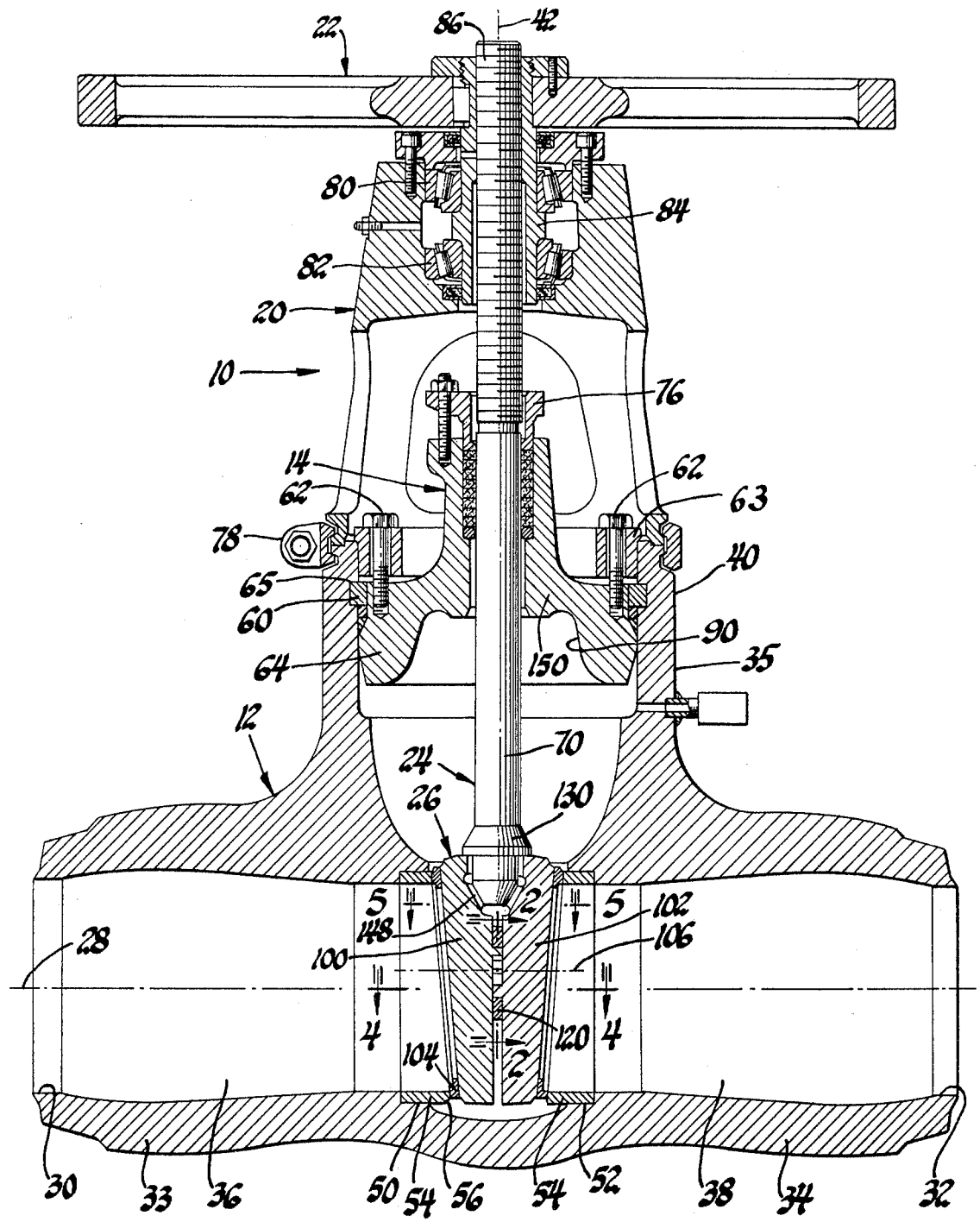
FIG. 1 is a cross-sectional view of a gate valve made in accordance with the present invention, showing the two piece gate in the closed position.

Referring to FIG. 1, there is shown a gate valve 10 of the type used for high pressure fluid applications such as electric power generation systems of either the fossil and nuclear type. Such a gate valve is useable in a product line ranging between nominal sizes of 1-½ inches and 42 inches and in ANSI pressure classes of 600, 900, 1500, 2500 and 4500.

The gate valve 10 generally comprises a valve body 12, a bonnet assembly 14, a yoke assembly 20 and a handwheel assembly 22. As hereinafter described, rotation of the handwheel assembly 22 raises and lowers an internal stem assembly 24 and a double disc gate 26 to open and close a fluid passage extending through the valve body 12 along axis 28 between a left hand outlet 30 and a right hand outlet 32. The direction of flow is dependent on the system and the present equally facilitates flow in either direction. The gate 26 includes individual gate discs 100 and 102 operatively annular spacer ring 120 captured in operative position by a segmented hub 33 made in accordance with the present invention.

The value body 12 is a generally T-shaped cast carbon steel construction and includes outlet sections 33 and 34 and a control section 35 mutually intersecting at a valving chamber occupied by the gate 26. The section 33 includes the aforementioned outlet 30 and a flow passage 36. The second 34 includes the aforementioned outlet 32 and a flow passage 38. The passages 36 and 38 are co-axially disposed along the flow axis 28. The end of control section 35 defines an upwardly opening cylindrical section 40 having an operational axis 42 which perpendicularly intersects the flow axis 28.

Figure 4:
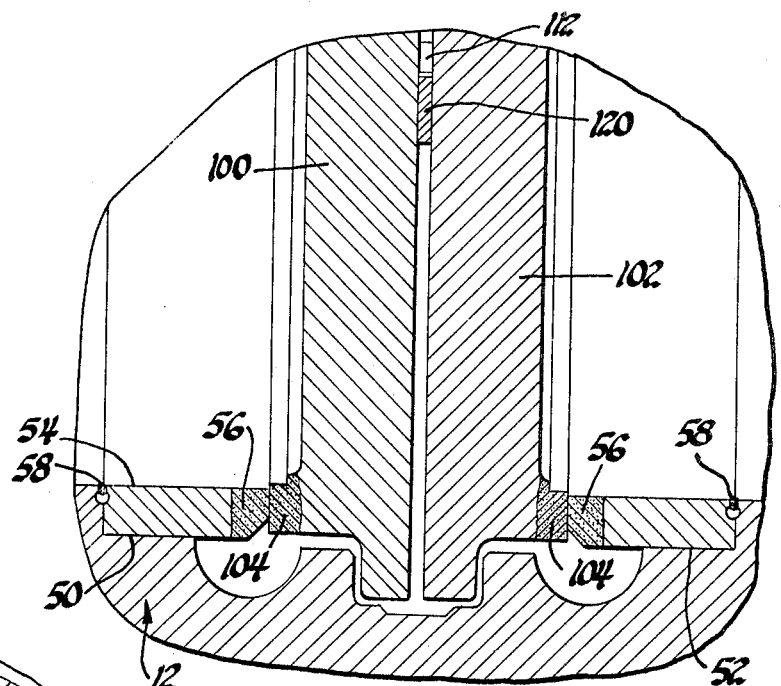
FIG. 4 is a view taken along line 4-4 of FIG. 1, showing the tongue and groove guides between the gate and the valve body.

The inner ends of the sections 33 and 34 are formed with counterbores 50 and 52 which contain cylindrical seat rings 54. The seat rings 54 are provided with hardened annular seats 56 (FIG. 4). The seats 56 are formed in plane inclined five degrees with respect to the operational axis 42. The planes of the seats 56 are symmetrically disposed with respect to the axes 42 and 28. The seat rings 54 are fixed to the inner surface of the valve body 12 at continuous circumferential welds 58.

The bonnet assembly 14 is retained at the upper end of the section 40 on the outer end of the section 35 by means of a split retainer ring 60. Bolts 62 clamp the ring 60 to draw the outer flange 63 of the bonnet 64 upwardly against the retainer ring 60 which is retained in a peripheral circumferential channel section 65. The bonnet 64 is centrally apertured and receives the stem 70 of assembly 24. The handwheel assembly 22 is attached at its outer end to the stem assembly and to at its lower end the gate 26. A packing gland assembly 76 seals the periphery of the stem 70.

The yoke assembly 20 is retained at the top of section 35 by means of a split yoke lock ring 78. A pair of roller bearings 80 and 82 have their outer races received in counterbores at the upper end of the yoke 20 and have their inner races fixedly carried at opposite ends of rotatable bushing 84 which has an internal thread engaging the threaded end 86 of the valve stem 70. The bushing 84 is keyed to the handwheel 22 such that rotation of the handwheel 22 rotates the bushing 84 to raise and lower the stem 70 through the packing assembly 76, thereby, raising and lowering the gate 26 between the illustrated lowered closed position and a raised opened position wherein the gate 26 is housed within a generally hemispherical depression 90 in a lower surface of the bonnet 64 so as to reduce the vertical height of the valve.

The gate assembly 26 comprises two identically formed gate discs 100 and 102. In assembly, the discs 100 and 102 have opposed seating surfaces hereinafter described which sealingly engage the seats 56 of the seat rings 54 to prevent migration of fluid past the sealing interfaces. Each disc has a projecting hardened seating surface 104 which is ground flat in a plane inclined with respect to its planar back surface at an angle equal to the inclination of the seat 56 or, in other words, five degrees with respect thereto. The outer diameter of the surface 104 is slightly larger than the seat 56. In initial assembly, in the fully seated closed position, the overall thickness of the gate 26 is sized such that the axis 106 of the gate is located above flow axis 28. As the seating surfaces wear, the axis 106 will shift downwardly and will maintain complete sealing contact until the outer diameter of surface 104 is unacceptably below the outer diameter of seat 56 at the upper center thereof.

Figure 2:
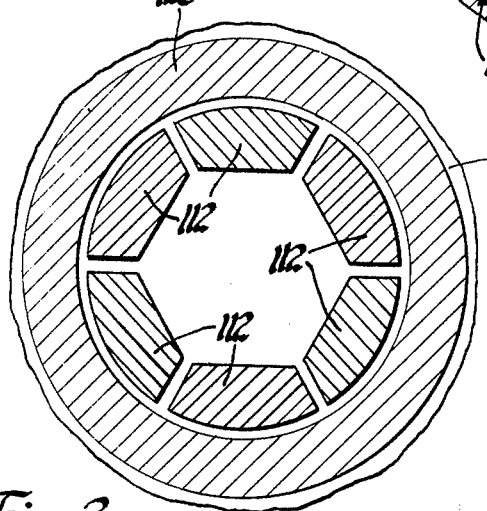
FIG. 2 is a view taken along line 2—2 of FIG. 1 and rotated 90° therefrom, showing one embodiment of a segmented hub in operating position with the spacer ring between the valve discs.
Figure 3:
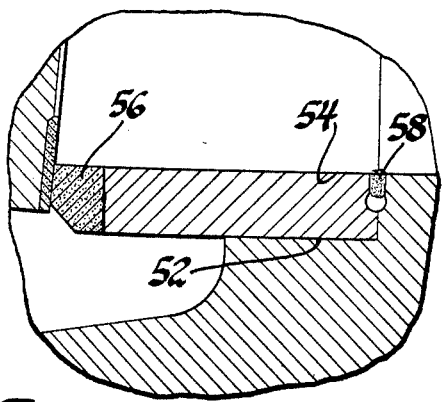
FIG. 3 is a fragmentary view showing the assembly of the seat ring to the valve body and its engagement with the seating surface on the gate disc.
Figure 9:
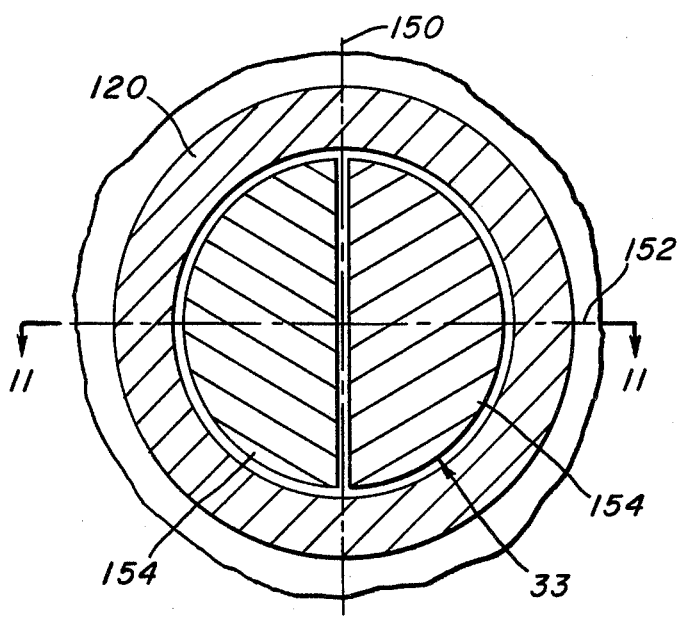
FIG. 9 is a view similar to FIG. 2 showing another embodiment of a segmented hub in accordance with the present invention.
Figure 11:
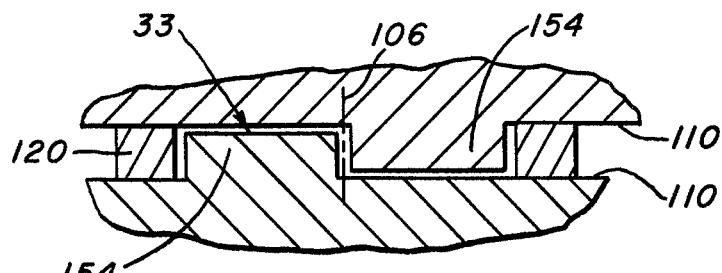
FIG. 11 is a view taken along line 11-11 of FIG. 9 representatively showing the interfitting of the lugs of the present invention to form the segmented hub.

In assembly, the gate discs 100 and 102 are spaced to an operative width by a circular spacer ring 120 which is captured by the segmented hubs of the embodiments shown in FIGS. 2, 9 and 11 and commonly referenced by the numeral 33.

Figure 8:
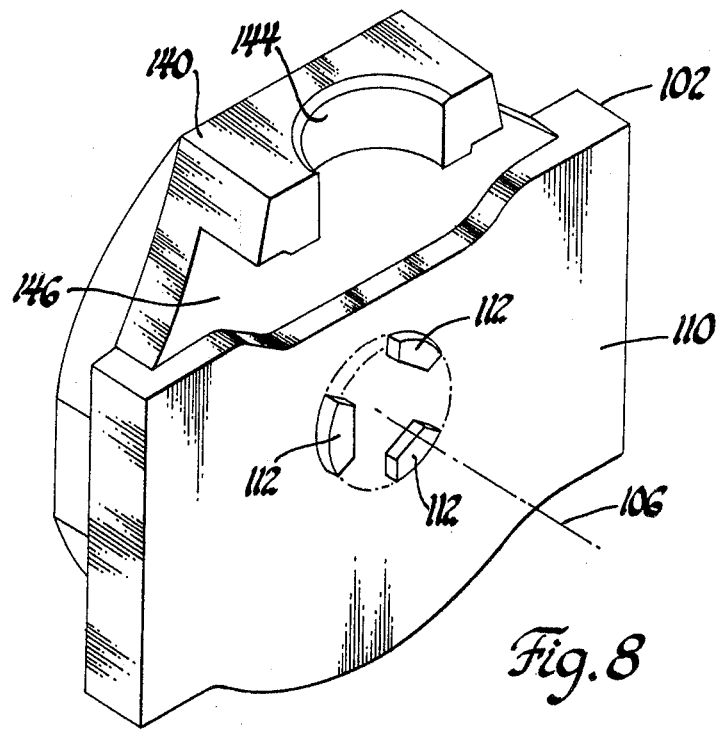
FIG. 8 is an enlarged perspective view of a valve disc illustrating the stem head slot and incorporating one form of segmented hub in accordance with the present invention.

Referring to FIG. 8, the rear surface 110 of the gate disc 102 is substantially planar being interrupted only by the three projecting segmented lugs 112 of the FIG. 2 embodiment which are equally circumferentially disposed with respect to the axis 106. This arrangement provides an uninterrupted datum surface for convenient accurate machining of the seating surface 104 and other critical machine operations on the individual discs. In assembly, the lugs of the various embodiments interfit with corresponding lugs on the juxtaposed gate disc to form the segmented circular hub 33. The interfitting side walls of the individual lugs are formed so as to provide a circumferential spacing with the adjoining lugs such that limited relative movement is accommodated without a corresponding interaction. The lugs have a height less than the width of the narrowest spacer ring such that the operative gate width is determined solely by the spacer ring. The interfitting lugs are axially expandable along axis 106 to accommodate varying predetermined widths of spacer rings while maintaining an operative capturing relationship therewith. The diameter of the segmented hub 33 is smaller than the inner diameter of annular spacer ring 120 for the foregoing reasons. The spacer ring 120 has a predetermined height or thickness which, in combination with the thickness of the individual discs, establishes an overall width for gate 26 sufficient to ensure proper seating of the gate discs against the seats. The ring 120 is substantially smaller in diameter than the seating surfaces to increase the deflection of the latter under pressure and stem loading.

Should excessive wear occur at the seating interfaces or should any of the seating surfaces become scored or otherwise damaged during operation, the gate must be removed and the seating surfaces refinished. Inasmuch as this will result in the removal of metal, there would be excessive downward travel of the gate past the point where sealing contact is established. This would normally necessitate the replacement of the entire gate. In the present instance, however, only the spacer ring 120 must be replaced. The only replacement requirement is that the thickness of the spacer ring compensate for material reduction occasioned by the machining operation to provide a predetermined width so as to re-establish the desired operational relationships between the seating surfaces.

Figure 5:
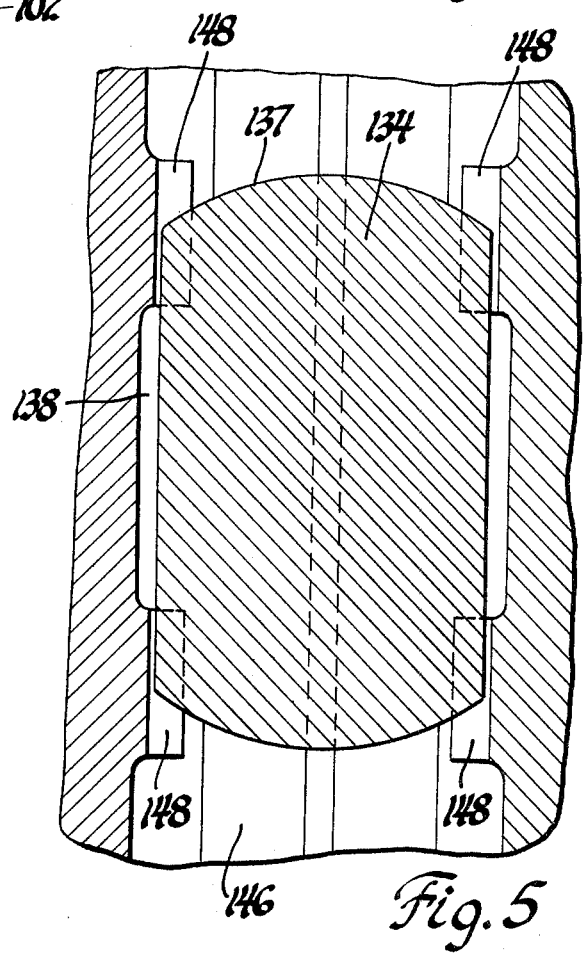
FIG. 5 is an enlarged fragmentary view taken along line 5-5 of FIG. 1, showing the stem head connection at the valve discs.
Figure 6:
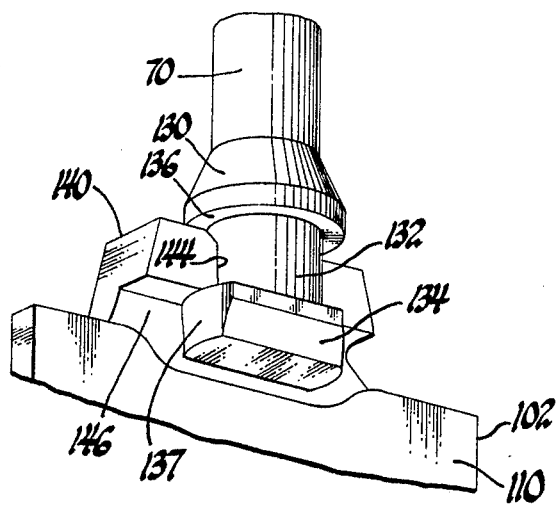
FIG. 6 is an enlarged fragmentary perspective view of the stem head in assembly with the valve discs.
Figure 7:
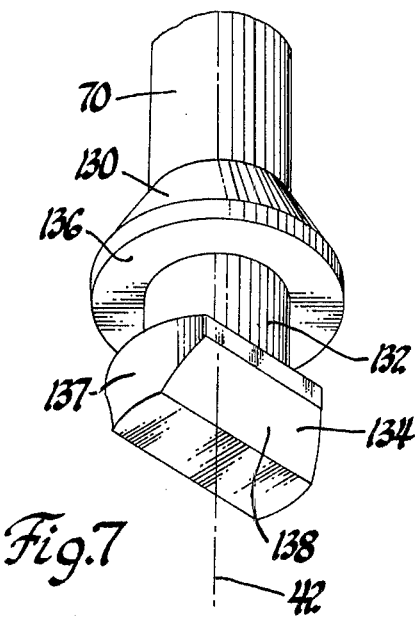
FIG. 7 is an enlarged perspective view of the stem head configuration.

The lower end of the stem 70 is provided with a T-head construction comprising an actuating collar 130, a cylindrical neck 132 and a T-wedge 134. As shown in FIGS. 5, 6, and 7, the collar 130 has a substantially frustoconical surface provided with a lower annular bearing surface 136. The T-wedge 134 has outer faces 137 substantially identical in diameter to the outer diameter of the collar 130 and inclined side surfaces 138 symmetrically disposed with respect to the axis 42 to thereby form a downwardly tapering wedge shaped section.

As shown in FIGS. 6 and 8, the individual discs 102 include an upper bearing surface 140 engageable by the surface 136, a semi-circular axial groove 144 adapted to loosely surround the neck 132 and a wedge shaped transverse slot 146 extending transverse to the axes 106 and 42. The slot is within the confines of the seating areas of the gate, resulting in a lowered profile. Pairs of raised inclined pads 148 are formed at the sides of the slots 146 and operationally have a slight clearance with respect to the inclined surfaces 138 of wedge 134. In assembled relationship as shown partially in FIG. 6, the stem head end is received within the slot 146 and the other half of the gate assembly is received thereover such that the wedge 134 is captured within the confines of the slots 146. The transverse slot design affirmatively retains the stem end and will permit entry thereof to the fluid line in the event of stem fracture.

Due to the wedge shape of the gate 26, the force transmitted by the stem assembly 24 to the seating surfaces is greatly magnified, resulting in a large sealing force between the mating seating surfaces. The independent flexure of the seating surfaces accommodated by the split wedge design allows the individual seating surfaces to flex and conform to the mating surfaces under fluid pressure without a corresponding reaction by the opposite disc. It also substantially equalizes the seating forces on the individual seating surfaces. Accordingly, when it is desired to move the gate assembly to the opposed position, the upper surface of the T-head 134 engages the undersurfaces of the slot 146 and, inasmuch as the discs are independent, the flexure thereby provided relieves the seating force sufficiently to disengage the seating surfaces.

The gate assembly has been translated upwardly through rotation of the handwheel 22 and upward movement of the stem 24 until such time as the conical back seat 130 of the stem 70 engages the back seat 150 on the bonnet 64. Thereat flow through the passages 36, 34 is substantially unrestricted.

It should be noted that only during the final closing and initial opening movement of the gate is there any mechanical or pressure loaded sliding movement of the seating surfaces across the seats, thereby, resulting in reduced cycle wear to these surfaces. The tongue and groove guiding of the discs as shown in FIG. 4 serves to axially restrain the discs in movement between positions and in association with the hubs axially capture the spacer ring.

Referring to FIGS. 2 and 8 through 13, the segmented hubs 33 shown therein include individual lugs interfitting with juxtaposed grooves. The lugs are symmetrically disposed in assembled relationship with respect to a vertical axis 150 parallel to the operational axis 42 and normal to the axis 106. For reference purposes, the horizontal axis 152 normally intersects the axis 106. The hubs, in assembly, are comprised of interfitting circular segments presenting a segmented cylindrical peripheral surface for peripherally restraining the inner circumferential peripheral surface of the spacer ring 120.

Figure 10:
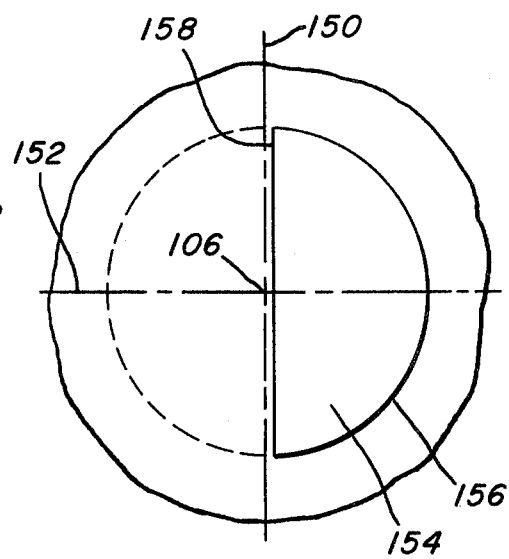
FIG. 10 is a fragmentary view of the lug for a single disc of the embodiment of FIG. 9.

With initial reference to FIGS. 9 through 11, the segmented hub therein is formed of two semi-circular segments 154, one being identically formed on each gate disc. Referring to FIG. 10, the semi-circular segments 154 include an outer circular side wall 156 coaxial with axis 106, and a connecting chordal wall 158 lying in a plane spaced slightly from the axis 106 and parallel to the vertical axis 150. The spacing establishes a clearance gap between the interfitting lugs 154 as shown in FIG. 9. This allows relative movement between the gate pieces without a resulting interaction between the surfaces of the hub. Additionally, it will be noted that a clearance exists between inner diameter of the spacer ring 120 and the outer segmented diameter of the hub 33. As shown in FIG. 11, the height or projection of the individual lugs 154 is less than the predetermined width of the narrowest spacer ring 120. This establishes a clearance with the rear surfaces 110 such that the overall width of the gate is established solely by the thickness of the spacer ring 120. With the inner fitting arrangement thus shown, it will be appreciated that the rear surfaces 110 may axially separate with segmented hub 22 providing continuous peripheral restraint for the spacer ring 120 to maintain its operative position.

Preferably the segmented hub 33 is cast on the rough gate piece and subsequently machined to a circular projection having the desired final diameter and height. Thereafter, the semicircular groove is formed by milling to remove portions of the hub and define a resulting semicircular projecting lug 156 in accordance with the above.

Figure 12:
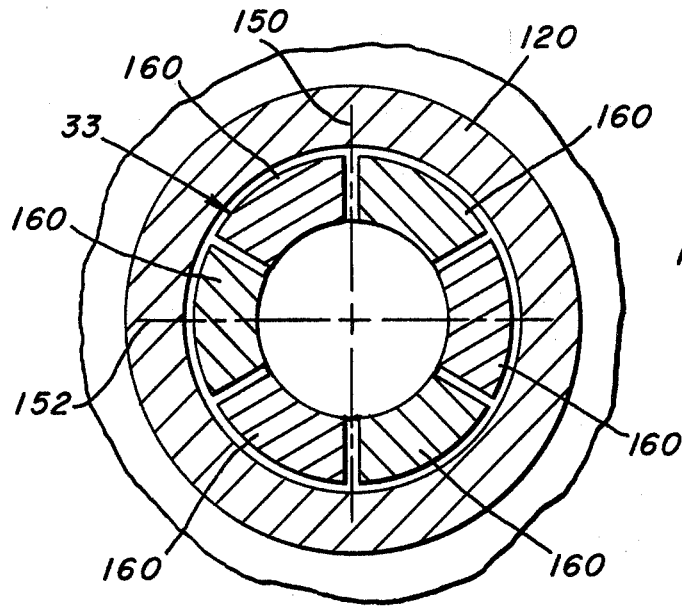
FIG. 12 is a view similar to FIG. 2 showing a further embodiment of a segmented hub in accordance with the present invention.
Figure 13:
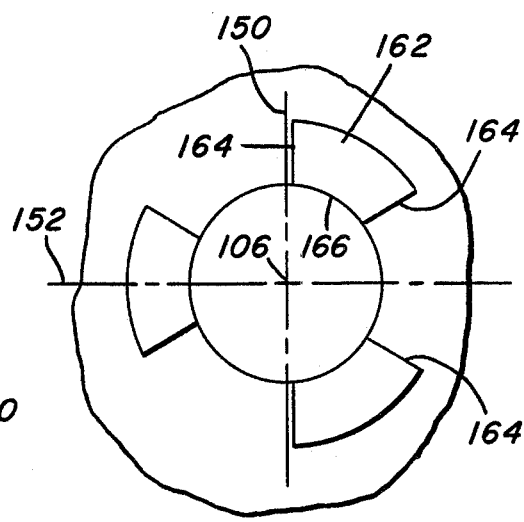
FIG. 13 is a fragmentary view of the lugs of a single disc of the embodiment of FIG. 12.

Another embodiment is shown in FIGS. 12 and 13 wherein the hub 33 is in the form of six equally circumferentially spaced circular segments 160. Thus as shown in FIG. 13, each gate disc is provided with three such projecting lugs 160. The individual lugs are defined by an outer circumferential wall 162 coaxial with the axis 106, a pair of radial side walls 164, and an inner circular wall 166. The planes containing the side walls 164 are slightly spaced from the axis 106 to establish clearance relationships with adjacent lugs as shown in FIG. 12. In assembly, the lugs 160 interfit to form a segmented circumferential peripheral surface with is expandable along axis 106 to maintain restraining relationship with the spacer ring 120 for varying widths of the latter. The segmented hub of this design is established by initially forming circular hub of the desired diameter and height. A hole having a diameter equal to that of the side wall 166 is drilled coaxial with axis 106. Thereafter or before, the sector between adjacent side walls 164 is removed with any suitable means such as milling to establish resultant lugs 160 of the desired size.

Referring to the embodiment of FIGS. 2 and 8, the lugs 112 therein interfit in assembly to form a series of six circumferentially spaced outer peripheral surfaces for restraining the spacer ring 120. The individual lugs are defined by outer circular side walls 170 coaxial with axis 106, radial side walls 172 lying in a plane spaced from the axis 106 to provide clearances between adjacent lugs in assembly, and chordal walls 174 connecting the inner ends of the side walls 172 and lying in a plane spaced a substantial distance from the axis 106 so as to define in assembled relationship a hexagonal interior space. The arrangement of the lugs is such that the leading side wall 172 of the first lug 170 lies in a common plane with a trailing side wall 172 of the second lug and is spaced a predetermined distance from the plane forming the chordal wall 174 of the third lug. Similarly, the trailing side wall 172 of the first lug lies in a common plane with leading side wall of the third lug and is spaced the same predetermined distance with respect to the chordal wall 174 of the second lug. Finally, the leading side wall of the second lug lies in a common plane with the trailing side wall of the third lug and is spaced a similar predetermined width from the chordal side wall of the first lug.

The aforementioned relationships between the chordal walls and the side walls are established by forming three intersecting constant width grooves in an initial circular hub of predetermined diameter and heighth. This provides the ability to establish individual lugs in a single machining setup by merely circumferentially indexing the gate piece with respect to the cutter.

In view of the above it will be appreciated that segmented peripheral restraining surface disclosed herein is formable in varying interfitting expandable designs by varying the number of lugs and the shapes thereof to provide a segmental peripheral surface, interior or exterior, bounding an opposed surface of the spacer ring thereby serving to capture the latter while accommodating varying predetermined thicknesses of the spacer rings. Accordingly, other forms of this invention in addition to the above embodiments shown and described will be readily apparent to those skilled in the art. Therefore, it is not intended to limit the scope of this invention by the embodiments selected for the purposes of this disclosure but only by the claims which follow.

What is claimed is:

1. In a double disc gate valve of the type having individual gate discs with juxtaposed surfaces separated by a predetermined distance to thereby establish an operative width for the gate which width is such that a sealing surface on each said gate disc is respectively against a valve seat to prevent flow along a flow axis through said valve, the improvement comprising: a spacer member having a predetermined length and being disposed between said gate discs as its opposite ends respectively make contact with said juxtaposed surfaces, spacer member retention means projecting perpendicularly from each of the juxtaposed surfaces interfitting in assembly, each of said retention means including at least one segment thereof which overlaps along said axis said segment of the other of said retention means, said gate discs and said segments thereof being capable of relative movement along said axis with said segments being combined to provide a segmented surface peripherally retaining the spacer member in operative position between said gate discs, and said predetermined length of said spacer member being selected to establish said predetermined distance.

2. The improvement recited in claim 1 wherein said spacer member retention means are identically formed on said juxtaposed surfaces.

3. The improvement recited in claim 2 wherein said spacer member includes an inner peripheral surface which is peripherally engaged by said segmented surface outwardly of said spacer member retention means.

4. The improvement recited in claim 3 wherein said inner peripheral surface of said spacer member is circular and said segmented surface on the spacer member retention means is a plurality of arcuate walls.

5. The improvement recited in claim 4 wherein said spacer member retention means includes a plurality of evenly circumferentially spaced projecting lugs having outer arcuate side walls and radial side walls adapted to interfit in juxtaposed assembly such that the arcuate side walls form a segmented expandable circular hub wherein the arcuate side walls are engageable with the inner surface of the spacer member to retain the latter in operative position.

6. The improvement recited in claim 5 wherein said spacer member retention means includes a center circular hole coaxial with the lugs.

7. The improvement recited in claim 5 wherein the radial side walls of the lugs are connected by a straight inner wall spaced from the axis of the lug.

8. The improvement recited in claim 3 wherein said spacer member retention means includes a semi-circular lug defined by a circular outer wall and a connecting chordal wall.

9. The improvement recited in claim 4 wherein said arcuate side walls provide at least three substantially equally circumferentially spaced areas engageable with the spacer member.

* * * * *

UNITED STATES PATENT AND TRADEMARK OFFICE
CERTIFICATE OF CORRECTION

PATENT NO. : 4,098,489
DATED : July 4, 1978
INVENTOR(S) : Ronald James Anders and Ramesh Mohan It is certified that error appears in the above-identified patent and that said Letters Patent are hereby corrected as shown below:

Column 1, Line 46, after "to" delete 'increas' and insert --increase--.

Column 2, Line 63, after "The" delete 'second' and insert --section--.

Column 3, Line 5, after "in" delete 'plane' and insert --planes--.

Signed and Sealed this

Thirteenth Day of February 1979

[SEAL]

Attest:

RUTH C. MASON
Attesting Officer

DONALD W. BANNER
Commissioner of Patents and Trademarks